Aug. 26, 1930.   H. B. WALTHERS   1,773,831

NONGLARE LENS FOR HEADLIGHTS

Filed Jan. 18, 1929

Inventor
Harry B. Walthers.
By H. J. O'Brien
Attorney

Patented Aug. 26, 1930

1,773,831

UNITED STATES PATENT OFFICE

HARRY B. WALTHERS, OF OMAHA, NEBRASKA

NONGLARE LENS FOR HEADLIGHTS

Application filed January 18, 1929. Serial No. 333,451.

This invention relates to improvements in lenses for headlights and has reference to a headlight lens construction adapted for use with the ordinary automobile headlights.

For night driving of automobiles, it is highly desirable to have the lights so constructed that the road will be illuminated as brightly as possible, and that the illuminations will extend to both sides of the road and to a considerable distance to the front, and at the same time, it is essential that there shall be as little objectionable glare as possible to interfere with the drivers of approaching vehicles.

It is the object of this invention to produce a lens of a simple construction that can be applied to an ordinary automobile headlight and which will give a good illumination of the road and will also throw lights transversely of the road to the full width thereof, without producing any objectionable glare.

This invention, briefly described, consists in making a headlight of a concave or dish-shape and providing the interior of the lens with a plurality of shutters, properly spaced and lying in planes making slight angles with the axes of the reflector so that the light will be reflected towards the right hand side of the road and so that the shutters will form obstructions which prevent glare from reaching the eyes of approaching drivers.

In order to more clearly describe the invention so that the construction and the manner in which it functions can be most readily understood, reference will now be had to the accompanying drawing in which the invention has been illustrated and in which.

Figure 1:
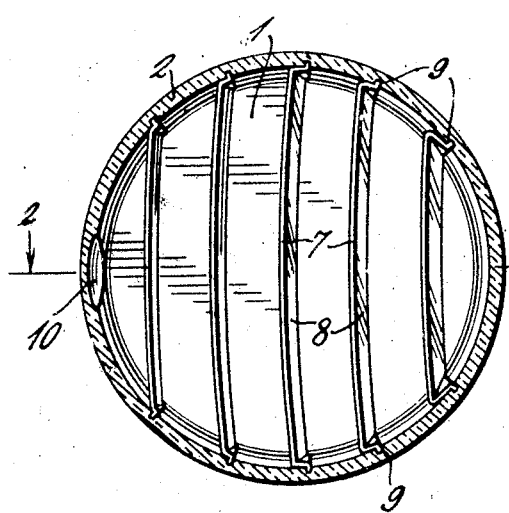
Fig. 1 is a section taken on line 1—1, Fig. 2.

In the drawing reference numeral 1 represents the lens which is made in the shape of a dish or pan and has conical sides 2 that terminate in outwardly extending flanges 3. These flanges are adapted to serve as means for attaching the lens to the lamp housing 4 by the same means now employed for holding the ordinary flat lens in place. Numeral 5 designates the ordinary parabolic reflector, and 6 represents the automobile headlight lamp.

In the ordinary automobile headlight the reflectors 5 are paraboloids of revolution, with their concave surfaces silvered so as to make them highly reflective. Such reflectors have the property of throwing a cylindrical beam of light when the light source is located at the focus point of the reflector. Such a concentrated beam of light, however, is not suitable for illuminating the road in front of an automobile and therefore the lamp filament is adjusted so as to lie either to the front or to the rear of the focal point of the reflector, and it is usually located to the rear and therefore rays of light as they emerge from the reflector diverge. These diverging rays will, when they strike the eye of an approaching driver, cause an intense glare which has a blinding effect, and which is a fruitful cause of accidents.

It is the object of this invention, as above pointed out, to modify the lens in such a way that the rays of light that would otherwise produce objectionable glare, will be reflected downwardly and towards the right of the road, and will thereby become converted into useful light instead of forming objectionable glare in the ordinary manner.

In order to produce the result desired, I have provided the improved reflector with a plurality of shutters 7, which extend vertically when the lens is in place and which are all inclined with respect to the axis of the reflector, so that any rays of light extending parallel with the axis of the reflector, will strike the reflecting surface 8 of the shutters and be directed towards the right hand side of the road. When the lamp is adjusted so as to throw divergent rays the rays which would otherwise pass outwardly at the left hand side of a vertical plane passing through the axis of the reflector will be reflected towards the right of the road and the rays of light on the right hand side of this vertical plane will pass outwardly without being interfered with by the shutters. If, on the other hand, the lamp is adjusted so that it will throw converging rays, the light from the right hand side of the vertical plane above referred to, will strike the reflecting surfaces of the shutters and be reflected towards the right of the road, so as to be made useful instead of being dissipated in rays forming objectionable glare.

Figure 2:
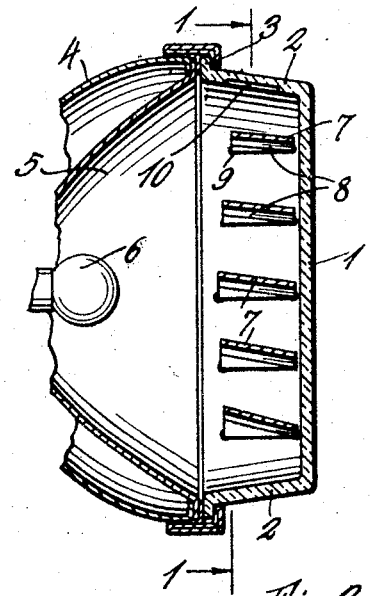
Fig. 2 is a section taken on line 2—2, Fig. 1.

The shutters have been shown as made from strips of metal of equal width and attached to the inner surface of the lens which has been provided with grooves 9 for the purpose of receiving the ends of the shutters. In Fig. 1 I have shown the shutters as slightly bowed and I consider this a preferable construction as by this means a somewhat greater reflecting action is obtained in connection with the rays nearer the top of the lens than at the center which seems to give better results when the actual illumination is considered. It is however permissible to make the shutters straight in the manner shown in Fig. 5. The shutters, instead of being made from strips of equal width, may be narrower at the ends than at the middle and the angle which they make with the axis of the reflector, may vary from zero to fifteen degrees. Although these shutters have been shown as made from metal, they may be made from any other suitable material, such as glass and it is desirable to have one side polished so as to form good reflectors, while the opposite sides of the shutters should be painted black. As the sides opposite from the reflecting sides are the ones that are seen by the approaching driver, it is apparent that as there is no light reflected from these surfaces there can be no glare. When a lens like that shown in Figs. 1 and 2 is employed it is apparent that a large amount of light can pass through the sides 2 and that therefore the light will be thrown towards the sides of the road, so as to light up the entire road surface. At the same time that the light is dispersed to the sides of the roads, it will not form any objectionable glare, for the reason that very little of this light will be reflected light, but will come directly from the filament. It is also my intention to sandblast the upper half of the sides 2 of the lenses to make them translucent so as to prevent objectionable glare from being produced to the sides. The sides 2 may be provided with bull's eyes 10 towards the outside of the automobile and these may be colored red so as to present a warning signal to cars approaching at right angles. The inner surfaces of the sides 2 below the horizontal plane passing through the axis of the reflector should be nonreflective so as to prevent the light rays that strike these surfaces from being thrown upwardly, while the corresponding surfaces above this horizontal plane may be hightly reflective so as to throw light downwardly upon the road.

Figure 5:
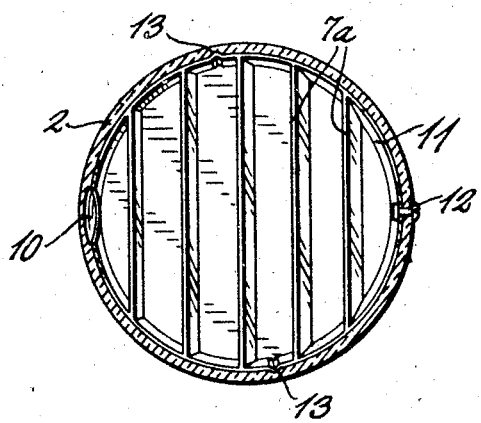
Fig. 5 is a section similar to that shown in Fig. 1 but shows the shutters attached to a metal frame that is inserted into the lens.

In Fig. 5 I have shown the shutters 7ª secured to a metal ring 11 that fits inside of the lens and which is held in place by means of bolts 12 extending through the ring and through the side of the lens. Small projections 13 may be provided to fit into depressions in the lens so as to hold the ring against rotation. The rings 11, being made of metal, are of course opaque and prevent light from passing through the sides. These rings are provided with an opening registering with the bull's eyes 10 so that these will be illuminated. The inner surface of the rings below the horizontal diametrical plane must be covered with a nonreflective paint, while the upper half of these rings may be reflective.

Figure 6:
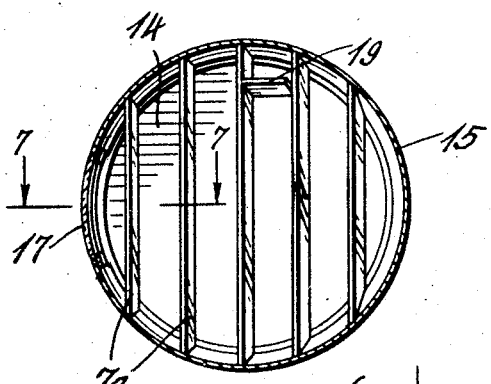
Fig. 6 is a view showing a modified form of construction in which the shutters are attached to a metal frame which also forms a supporting ring for the lens; this view being taken on line 6—6, Fig. 7.
Figure 7:
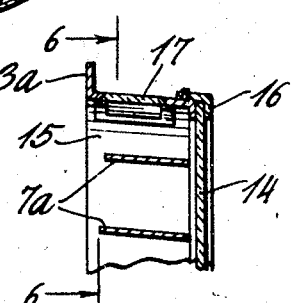
Fig. 7 is a section taken on line 7—7, Fig. 6.

In Figs. 6 and 7 I have shown a slightly modified construction in which the lens is formed by a flat piece of glass which has been designated by reference numeral 14, this is secured to the open end of a metal ring 15 by means of a clamping ring 16. Ring 15 is provided with an outwardly extending flange 3ª which corresponds to the flange 3 on the dish-shaped lens and serves as a means for making attachment between the lens and the headlight housing. The louvers 7ª are made exactly like those shown in Fig. 5 and are secured at their ends to ring 15. As rings 15 are opaque they are each provided with an opening which is closed by means of a transparent strip of celluloid 17 of red color so as to form bull's eyes corresponding to bull's eyes 10. The assemblies made as shown in Figs. 6 and 7 are substituted for the glass lens shown in Figs. 1 and 2.

Figures 3, 4:
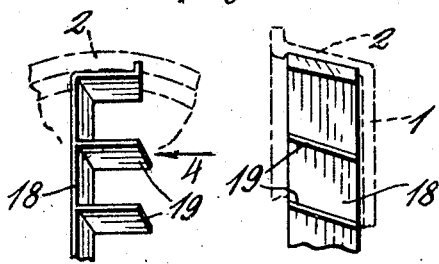
Fig. 3 is a detail showing a modified form of construction of shutters.
Fig. 4 is a view looking in the direction of arrow 4, Fig. 3.

In Figs. 3 and 4 I have shown a slight modification in which the vertical shutters 18 which correspond to shutters 7 and 7² may be provided with a few short laterally extending portions 19 that assist in directing upwardly projecting rays downwardly so as to more effectively prevent the dispersion of light in useless rays. The relative position of one of these projections has been shown in Fig. 6. There may be only a few of these projections located adjacent the top of the lens assembly, or there may be as many as are deemed necessary for the purpose of obtaining the results desired.

The shutters that are set into the lens may be straight instead of slanting and the grooves in the lens must, of course, correspond. Where the grooves are straight and the shutters slanting the shutters are crimped or bent in the manner shown in the drawing.

It is also possible to use holes or indentations in the lens and to provide the ends of the shutters with points or projections that extend into the holes. Improved results may be obtained by making the rear edges of the shutters nearest the center somewhat concave and applying one or more layers of fine mesh wire screen to the shutters over the concave cut-outs. The screen reduces the intensity of the light where it passes through the screen and thereby reduces the tendency to produce glare.

From the above description it will be apparent that I have produced a very simple lens assembly that is effective for preventing glare and which is so constructed that practically all of the light is directed onto the road surface so as to be useful and therefore that a greater illumination efficiency is obtained than when my invention is not employed.

Although I have illustrated my invention by means of several specific embodiments, I want it understood that this is for the purpose of explanation only, and that the same results may be obtained by a specifically different means, which still, however, fall within the scope of this invention.

Having described the invention, what is claimed as new is:

1. A circular dish-shaped lens having a sloping side wall provided with an outwardly extending flange, the inner surface of the side wall being provided with a plurality of pairs of grooves, the two grooves of each pair being located at the ends of chords and shutters having their ends located in the grooves.

2. A lens for automobile headlights, said lens comprising a glass member of dish-shape and provided with a sloping side wall, the inner surface of the side wall having a plurality of pairs of grooves, the two grooves of each pair being at the extremities of a chord, the several pair of grooves being so located that the chords are parallel, and a shutter for each pair of grooves, the opposite ends of each shutter being located in corresponding grooves of a pair.

In testimony whereof I affix my signature.

HARRY B. WALTHERS.